United States Patent Office 3,094,528
Patented June 18, 1963

3,094,528
DERIVATIVE OF 4-PHENYL-CARBETHOXY-PIPERIDINE AND SALTS THEREOF
Martin A. Davis, Montreal, Quebec, Canada, assignor to American Home Products Corporation, New York, N.Y., a corporation of Delaware
No Drawing. Filed June 26, 1961, Ser. No. 119,336
4 Claims. (Cl. 260—243)

This invention relates to a new pharmacologically-active compound, a derivative of 4-phenyl-4-carbethoxy-piperidine, to its acid salts, and to the procedure by which these new compounds may be prepared from available starting materials.

The new derivative of 4-phenyl-4-carbethoxypiperidine, both in base and salt forms, is characterized by antitussive action and by high activity as a local anaesthetic agent. It has a relatively low order of toxicity and appears to have promise as a pharmaceutical. The compound, both in base and salt forms, is characterized by antispasmodic activity of a low order.

It may be administered as an antitussive medication in the form of one of its water-soluble salts in solid dosage forms, such as tablets or capsules containing an excipient such as, for example, lactose, a disintegrating agent such as, for example, starch, and a lubricant such as, for example, magnesium stearate, or in liquid preparations such as syrups, which may advantageously contain expectorant and secretolytic additives, such dosage forms to contain from 10 to 50 mg. of the active compound per dosage unit.

The new chemical compound [2-(4-carbethoxy-4-phenypiperidino)ethoxy]ethyl phenothiazine-10-carboxylate, in base form, has the following structural formula:

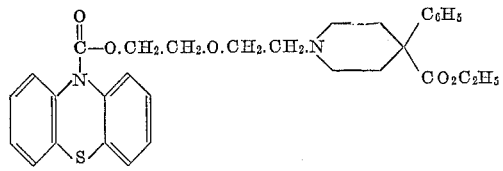

The compound [2-(4-carbethoxy-4-phenylpiperidino)-ethoxy]ethyl phenothiazine-10-carboxylate is readily prepared by the interaction of phenothiazine-10-carboxylic acid chloride and [2-(4-carbethoxy-4-phenylpiperidino)-ethoxy]ethanol, the reaction being carried out in an acid-binding medium, preferably in pyridine.

The intermediate, substituted ethanol, may be prepared from 2-(chloroethoxy)ethanol and 4-carbethoxy-4-phenyl-piperidine in accordance with known procedures.

Further details of the procedures involved will be found in the appended illustrative examples.

EXAMPLE 1

*[2-(4-Carbethoxy-4-Phenylpiperidino)Ethoxy]Ethyl Phenothiazine-10-Carboxylate*

[2 - (4 - carbethoxy - 4 - phenylpiperidino)ethoxy]-ethanol was prepared by the method of Morren, Belg. Patent No. 552,626 (1957); Ind. Chim. Belg. 22, 795 (1957) from 2-(chloroethoxy)ethanol and 4-carbethoxy-4-phenylpiperidine.

A solution of this basic alcohol (7.7 g., 0.024 mole) in dry pyridine (15 ml.) was added to a slurry of pheno-thiazine-10-carboxylic acid chloride (6.3 g., 0.024 mole) in pyridine (10 ml.). The reaction mixture was stirred at room temperature for one hour and subsequently at 85° C. for forty minutes.

The mixture was then cooled, added to ice-water and the gum which had formed was triturated with small portions of dilute hydrochloric acid in order to remove the pyridine. The gum was then shaken with benzene and aqueous sodium carbonate solution, and the benzene layer was separated, dried and evaporated. The residue was taken up in benzene-hexane mixture and treated with charcoal. Evaporation then left 10.6 g. (81% yield) of solid base, of M.P. 73–82° C. (decomp.). The melting point was gradually raised to 80–87° C. (decomp.) on recrystallization from isopropanol-hexane.

Treatment of an ethereal solution of the base with hydrogen chloride gave the hydrochloride salt of [2-(4-carbethoxy - 4 - phenylpiperidino)ethoxy]ethyl phenothia-zine-10-carboxylate; needles from acetonitrile, M.P. 173–174° C. (decomp.) with prior softening at 114° C.

Analysis confirmed the empiric formula $C_{31}H_{35}ClN_2O_5S$.
Required: Cl, 6.08; S, 5.50%. Found: Cl, 5.69, 5.76; S, 5.64, 5.56%.

The hydrochloride salt was stirred with a mixture of aqueous sodium hydroxide solution and benzene until dissolution was complete. The benzene layer was separated, washed with water, and dried. Evaporation of the solvent and recrystallization of the product from isopropanol-hexane (charcoal) gave a purified sample of the base [2-(4-carbethoxy - 4 - phenylpiperidino)ethoxy]ethyl phenothiazine-10-carboxylate, melting at 88–90° C.

Analysis confirmed the empiric formula $C_{31}H_{34}N_2O_5S$.
Required: C, 68.11; H, 6.27; S, 5.87%. Found: C, 68.69; H, 6.05; S, 5.68, 5.83%.

EXAMPLE 2

*[2 - (4 - Carbethoxy - 4 - Phenylpiperidino)Ethoxy]Ethyl Phenothiazine-10-Carboxylate Methanesulfonic Acid Salt*

A solution of the free base described in Example 1 in ether-ethyl acetate was treated with a small molar excess of methanesulfonic acid. The methanesulfonic acid addition salt of [2-(4-carbethoxy-4-phenylpiperidino)ethoxy]-ethyl phenothiazine-10-carboxylate thus produced was recrystallized from absolute ethanol. It melted at 159–162° C.

Analysis confirmed the empiric formula $C_{32}H_{38}N_2O_8S_2$.
Required: N, 4.36; S, 9.96%. Found: N, 4.79, 4.89; S, 9.41, 9.38%.

I claim:
1. A compound selected from the group which consists of [2 - (4 - carbethoxy - 4 - phenylpiperidino)ethoxy]ethyl phenothiazine-10-carboxylate, and its hydrochloride and methanesulfonic acid addition salts.
2. [2 - (4 - carbethoxy - 4 - phenylpiperidino)ethoxy]-ethyl phenothiazine-10-carboxylate.
3. The hydrochloride salt of [2-(4-carbethoxy-4-phenylpiperidino)ethoxy]ethyl phenothiazine-10-carboxylate.
4. The methanesulfonic acid addition salt of [2-(4-carbethoxy-4-phenylpiperidino)ethoxy]ethyl phenothiazine-10-carboxylate.

References Cited in the file of this patent
UNITED STATES PATENTS

| | | |
|---|---|---|
| 2,778,824 | Von Seemann | Jan. 22, 1957 |
| 2,858,316 | Morren | Oct. 28, 1958 |
| 2,951,077 | Meyers et al. | Aug. 30, 1960 |
| 2,989,529 | Schuler | June 30, 1961 |
| 3,024,241 | Frearson et al. | Mar. 6, 1962 |

OTHER REFERENCES

Chappel et al.: Canadian J. Biochem. & Physiol., vol. 36, pages 475–481 (1958).